(12) United States Patent
Riggs et al.

(10) Patent No.: US 10,457,341 B2
(45) Date of Patent: Oct. 29, 2019

(54) UNDERBODY CHANNEL VORTEX GENERATORS

(71) Applicant: GM GLOBAL TECHNOLOGY OPERATIONS LLC, Detroit, MI (US)

(72) Inventors: Daniel L. Riggs, West Bloomfield, MI (US); David C. Caples, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 15/927,158

(22) Filed: Mar. 21, 2018

(65) Prior Publication Data

US 2019/0291790 A1 Sep. 26, 2019

(51) Int. Cl.
B62D 35/02 (2006.01)
B62D 37/02 (2006.01)
B62D 35/00 (2006.01)

(52) U.S. Cl.
CPC ........... *B62D 35/02* (2013.01); *B62D 35/005* (2013.01); *B62D 37/02* (2013.01)

(58) Field of Classification Search
CPC .... B62D 35/005; B62D 35/008; B62D 35/02; B62D 37/02

USPC ...................................................... 296/180.1
See application file for complete search history.

(56) References Cited

U.S. PATENT DOCUMENTS

| | | | | |
|---|---|---|---|---|
| 5,322,340 A | * | 6/1994 | Sato | B62D 25/20 180/68.1 |
| 2013/0278011 A1 | * | 10/2013 | Matsuyama | B62D 35/02 296/180.2 |
| 2014/0070564 A1 | * | 3/2014 | Bernard | B62D 35/005 296/180.3 |
| 2015/0008698 A1 | * | 1/2015 | Reisenhofer | B62D 25/20 296/180.1 |
| 2017/0297637 A1 | * | 10/2017 | Shinedling | B62D 35/02 |

* cited by examiner

*Primary Examiner* — Jason S Daniels

(57) ABSTRACT

A vehicle including a vehicle body having a first end and an opposing second end, wherein the first end is configured to face oncoming airflow. An underbody extending between the first and second ends of the vehicle body and the underbody including a first lateral edge, an opposing second lateral edge and a central region defined therebetween. At least one aerodynamic member on the underbody, the at least one aerodynamic member having at least one aerodynamic surface wherein the at least one aerodynamic surface includes at least one curved triangular channel configured to cause airflow to separate over a trip edge of the at least one curved triangular channel to create a low pressure vortex region within the curved triangular channel.

16 Claims, 10 Drawing Sheets

UNDERBODY CHANNEL VORTEX GENERATORS

INTRODUCTION

The present disclosure relates to an aerodynamic underbody arrangement for a vehicle.

Vehicle aerodynamic properties may be adjusted to both improve and reduce operational functions of the vehicle. For example, adjusting vehicle aerodynamics may reduce drag and wind noise while minimizing noise emission during vehicle operation. Adjusting vehicle aerodynamics may also be used to achieve downforce and improve vehicle traction and cornering abilities. Various types of components may be incorporated with vehicles, such as spoilers, air dams and the like, on different surfaces of the vehicle to adjust aerodynamic properties.

SUMMARY

A vehicle includes a vehicle body having a first end and an opposing second end. The first end of the vehicle is configured to face oncoming airflow when the vehicle is in motion relative to a road surface. An underbody extends between the first and second ends of the vehicle body. The underbody defines a space between the vehicle body and the road surface and includes a first lateral edge, an opposing second lateral edge and a central region defined therebetween.

At least one aerodynamic surface wherein the at least one aerodynamic surface includes at least one curved triangular channel configured to cause airflow to separate over a trip edge of the at least one curved triangular channel to create a low pressure vortex region within the curved triangular channel. The trip edge of the at least one curved triangular channel may be a flush or a proud trip edge and each being configured to cause airflow to separate while traveling over the trip edge thereby generating a low pressure vortex region. This low pressure vortex region acts normal to the at least one aerodynamic surface resulting in an aerodynamic downforce. The at least one curved triangular channel is low profile or sub-flush relative to the underbody.

In one embodiment, the at least one aerodynamic surface includes a first curved triangular channel wherein the first curved triangular channel is directed toward the first lateral edge of the underbody, and at least a second curved triangular channel wherein the at least second curved triangular channel is directed toward the first lateral edge of the underbody.

The at least one aerodynamic surface may further include a third curved triangular channel opposite the first curved triangular channel, the third curved triangular channel wherein the third curved triangular channel is directed toward the opposing second lateral edge of the underbody, and at least a fourth curved triangular channel opposite the at least second curved triangular channel, the at least fourth curved triangular channel wherein the at least fourth curved triangular channel is directed toward the opposing second lateral edge of the underbody.

A diffuser assembly is disposed proximate the rear end of the vehicle body on the underbody. The diffuser assembly cooperates with the at least one aerodynamic surface to accelerate the airflow pattern through the underbody. The at least one aerodynamic surface is integrally formed into the underbody. The first, the at least second, the third, and the at least fourth curved triangular channels are also integrally formed into the underbody.

The above features and advantages and other features and advantages of the present disclosure are readily apparent from the following detailed description of the best modes for carrying out the disclosure when taken in connection with the accompanying drawings.

DETAILED DESCRIPTION

Figure 1:
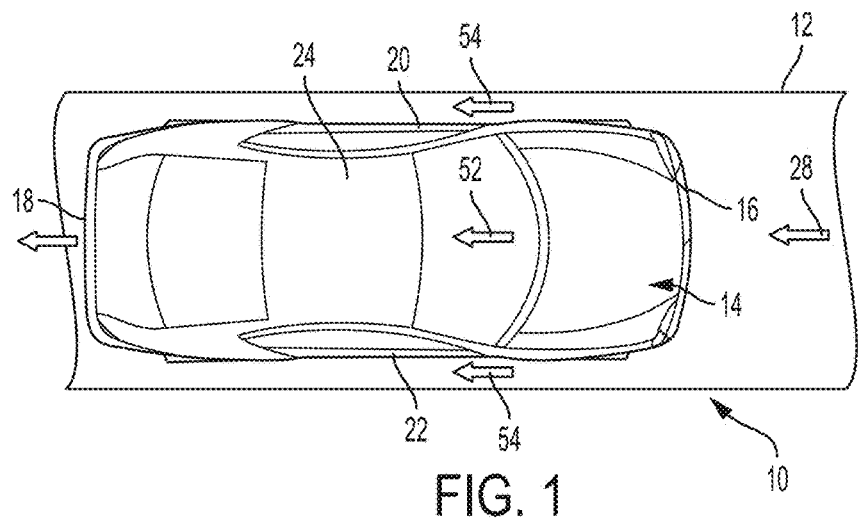
FIG. 1 is a schematic top view of a vehicle having an aerodynamic underbody arrangement in accordance with the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Referring to the drawings, wherein like reference numbers correspond to like or similar components throughout the several Figs., an example vehicle 10 is shown schematically in FIG. 1. The vehicle 10 may include, but not be limited to, a commercial vehicle, industrial vehicle, passenger vehicle, aircraft, watercraft, train or any mobile platform. It is also contemplated that the vehicle may be any mobile platform, such as an airplane, all-terrain vehicle (ATV), boat, personal movement apparatus, robot and the like to accomplish the purposes of this disclosure.

Figure 2:
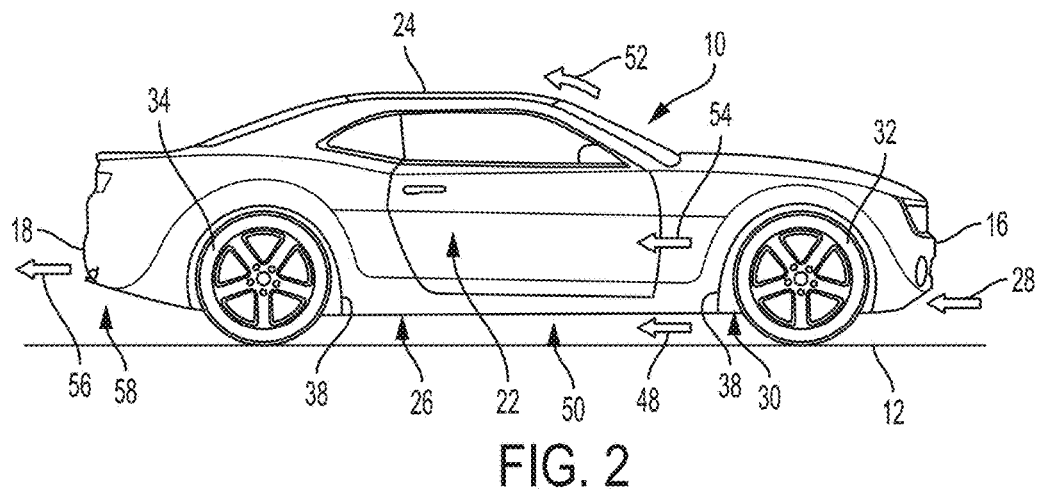
FIG. 2 is a schematic side view of the vehicle shown in FIG. 1.

The vehicle 10 in FIG. 1 is positioned relative to a road surface 12. The vehicle 10 includes a vehicle body 14. The vehicle body 14 defines six body sides. The six body sides include a first end or front end 16, an opposing second end or rear end 18, a first lateral portion or left side 20 generally extending between the first and second ends 16, 18, and an opposing second lateral portion or right side 22. The vehicle body 14 further includes a top body portion 24, which may include a vehicle roof portion, and an opposing lower body portion or underbody 26 as shown in FIG. 2. As understood by those skilled in the art, the first or front end 16 may be configured to face oncoming ambient airflow 28 when the vehicle 10 is in motion relative to the road surface 12.

The vehicle 10 includes a frame 30 cooperating with and supporting the vehicle body 14. The frame 30 supports a first set of one or more wheels 32 disposed proximate the first or front end 16 of the vehicle 10 and a second set of one or more wheels 34 disposed proximate the second or rear end 18 of the vehicle 10. As shown in FIG. 1, the first set of one or more wheels 32 includes a pair of front wheels that are rotatably connected to the frame 30 and rotate about an axis while the second set of one or more wheels 34 includes a pair of rear wheels that are rotatably connected to the frame 30 and rotate about an axis.

As shown in FIG. 2, the underbody 26 may generally extend or span a distance between the first and second ends 16, 18 of the vehicle body 14. The underbody 26 may include one or more wheel wells or openings 38 formed therein. As shown in the Figs., the one or more openings may include one or more wheel wells 38 provided in the vehicle body 14. The wheel wells 38 are sized to receive a portion of the wheels 32, 34 mounted on the frame 30 of the vehicle 10.

Figure 3:
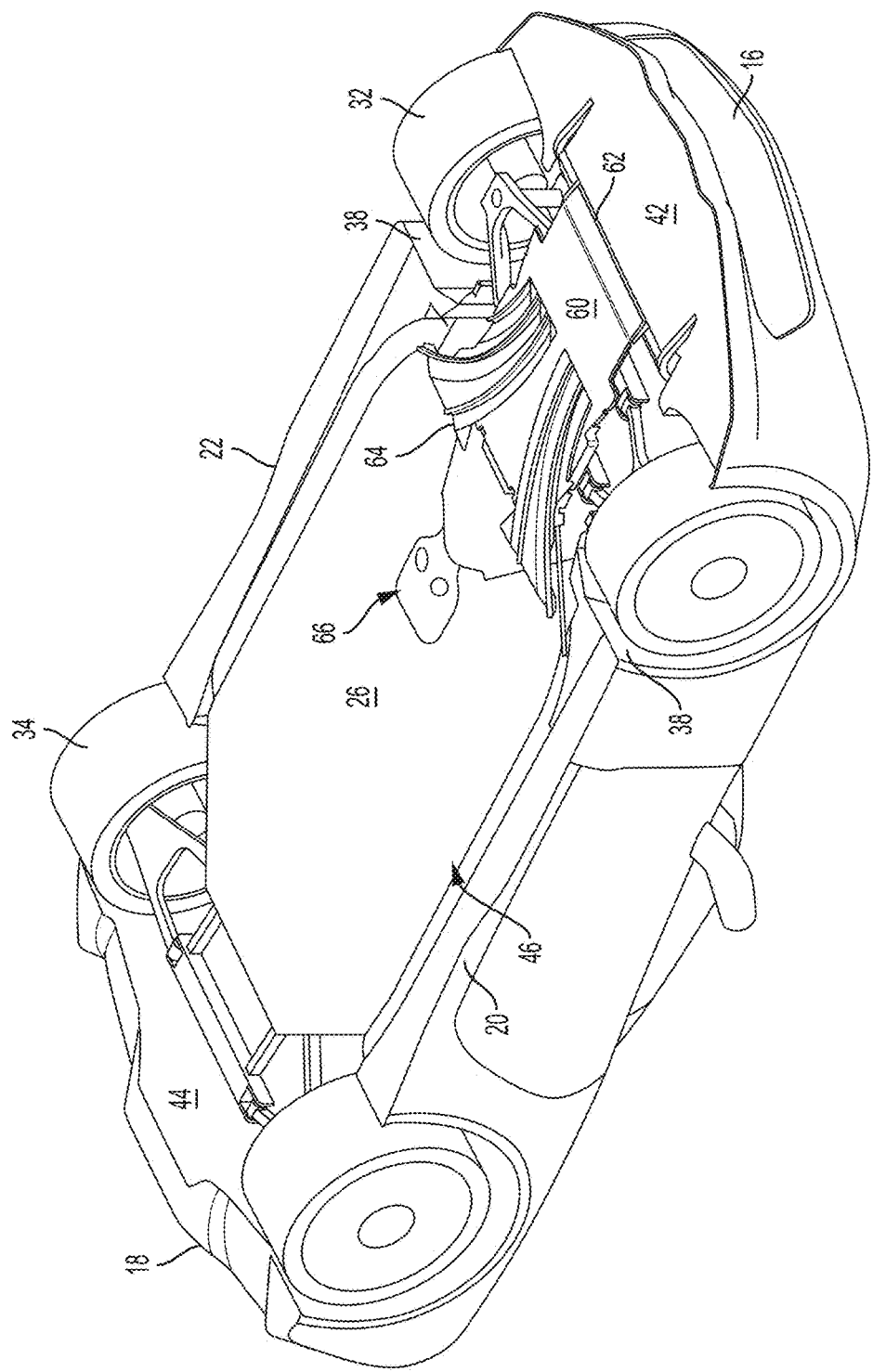
FIG. 3 is a bottom perspective view of a vehicle having an aerodynamic underbody arrangement in accordance with aspects of an exemplary embodiment.

Referring now to FIG. 3, the underbody 26 of the vehicle 10 may be defined by one or more regions extending between the first or front and second or rear body ends. A forward underbody portion 42 may be defined as an area of the underbody 26 generally extending between the first or front end 16 of the body 14 and the one or more front wheel 32. A rearward underbody portion 44 may be defined as an area of the underbody 26 generally extending between the one or more rear wheels 34 and the second or rear end 18 of the body 14. A middle underbody portion 46 may be defined as an area of the underbody 26 between the forward underbody portion 42 and rearward underbody portion 44. Alternatively, the middle underbody portion 46 may be defined as an area of the underbody 26 generally extending between the one or more front wheels 32 and one or more rear wheels 34 of the vehicle 10. It is understood that the underbody regions described herein may also be configured in alternative configurations based upon the configuration of the vehicle 10.

The underbody 26 may include substantially flat surface portion. Components of various vehicle sub-systems, for example of an engine exhaust system and a vehicle suspension, may also be disposed or positioned into specially formed passages on the underbody 26. A first airflow portion 48 may flow past the vehicle body 14 with limited disturbance (see FIG. 2). The underbody 26 may also define a space 50 between the vehicle body 14 and the road surface 12. Accordingly, the space 50 permits the first airflow portion 48 to pass under the vehicle body 14, between the vehicle body 14 and the road surface 12, while a second airflow portion 52 passes over the top body portion 24.

Furthermore, a third airflow portion 54 passes around the left and right sides 20, 22 of the vehicle body 14. The airflow portions 48, 52, 54 rejoin behind the second end 18 in a wake area or recirculating airflow region 56 immediately behind the rear end 18 of the moving vehicle 10. As understood by those skilled in the art, the recirculating airflow region 56 is generally caused at elevated vehicle speeds by the flow of surrounding air around the body sides 20, 22, 24, and 26 of the vehicle 10.

The vehicle 10 may also include a diffuser assembly (not shown) disposed proximate the rear end 18 of the vehicle body 14 on the rearward underbody portion 44. The diffuser assembly may be configured to control the first airflow portion 48 past the underbody portion 26 through the space 50 and out to the ambient environment. The diffuser assembly may include a panel (not shown) that may be configured to selectively extend into and retract from the ambient airflow in the recirculating airflow region 56 when the vehicle 10 is in motion relative to the road surface 12. The panel may be formed from a suitably rigid but low mass material, such as an engineered plastic or aluminum. The panel may enhance the aerodynamic profile of the vehicle body 14 by providing a degree of "wake infill" whereby the recirculating airflow region 56 is filled immediately behind the moving vehicle. The diffuser assembly is configured to cooperate with at least one aerodynamic surface 60 (see FIG. 3) to accelerate the airflow pattern through the underbody to generate a downforce on the vehicle to improve the aerodynamic profile of the vehicle body 14.

Referring now to FIG. 3, a bottom perspective view of a vehicle 10 having an aerodynamic underbody arrangement in accordance with aspects of an exemplary embodiment is provided. A vehicle body 14 is provided having a first end 16 and an opposing second end 18, wherein the first end 16 is configured to face oncoming airflow when the vehicle 10 is in motion relative to a road surface 12.

An underbody 26 extending between the first and second ends 16, 18 of the vehicle body 14 and defining a space 50 between the vehicle body 14 and the road surface 12. The underbody 26 includes a first lateral edge 20, an opposing second lateral edge 22 and a central region 66 defined therebetween.

Figure 4:
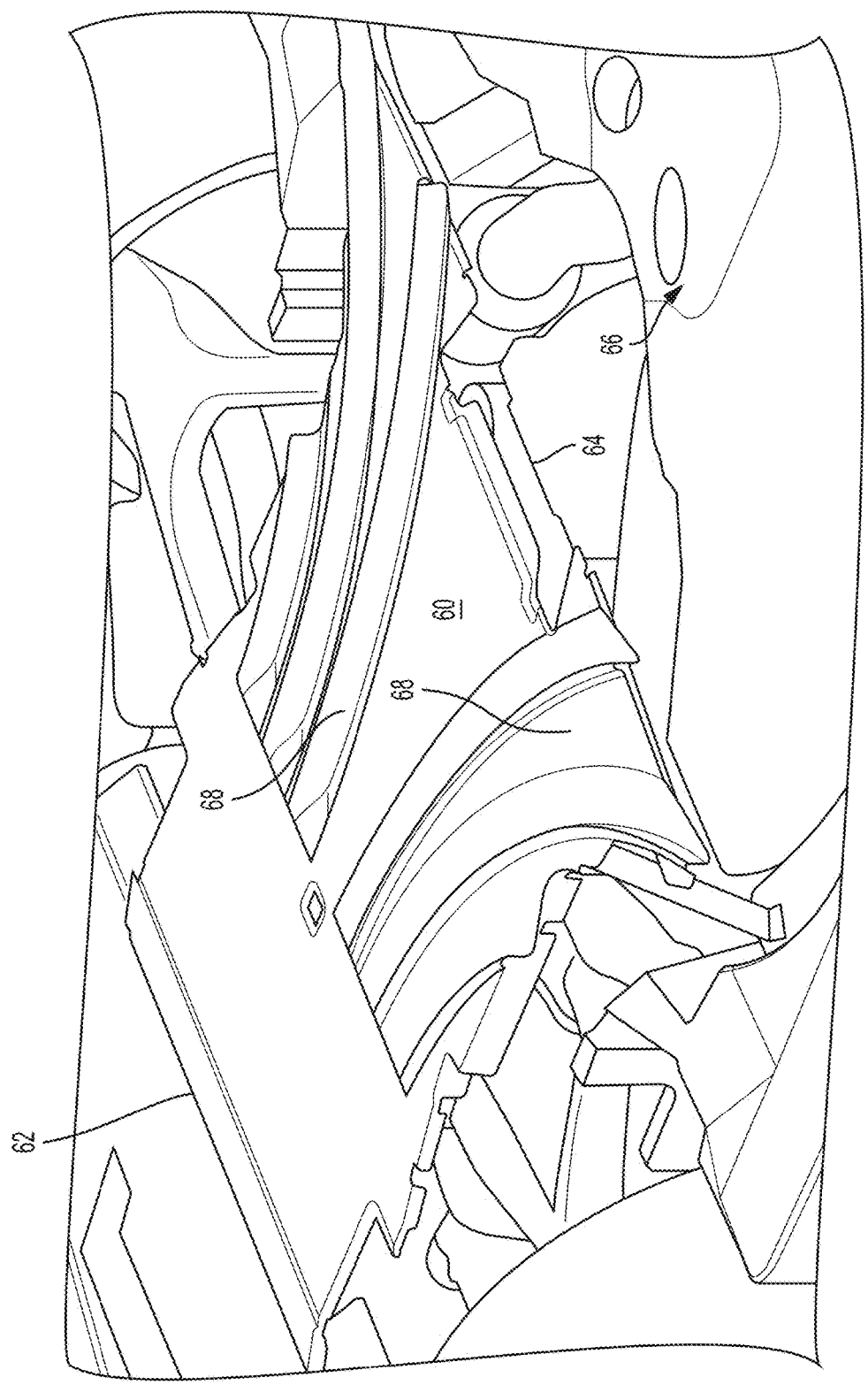
FIG. 4 illustrates an aerodynamic surface disposed on a vehicle underbody in accordance with aspects of an exemplary embodiment.
Figure 5:
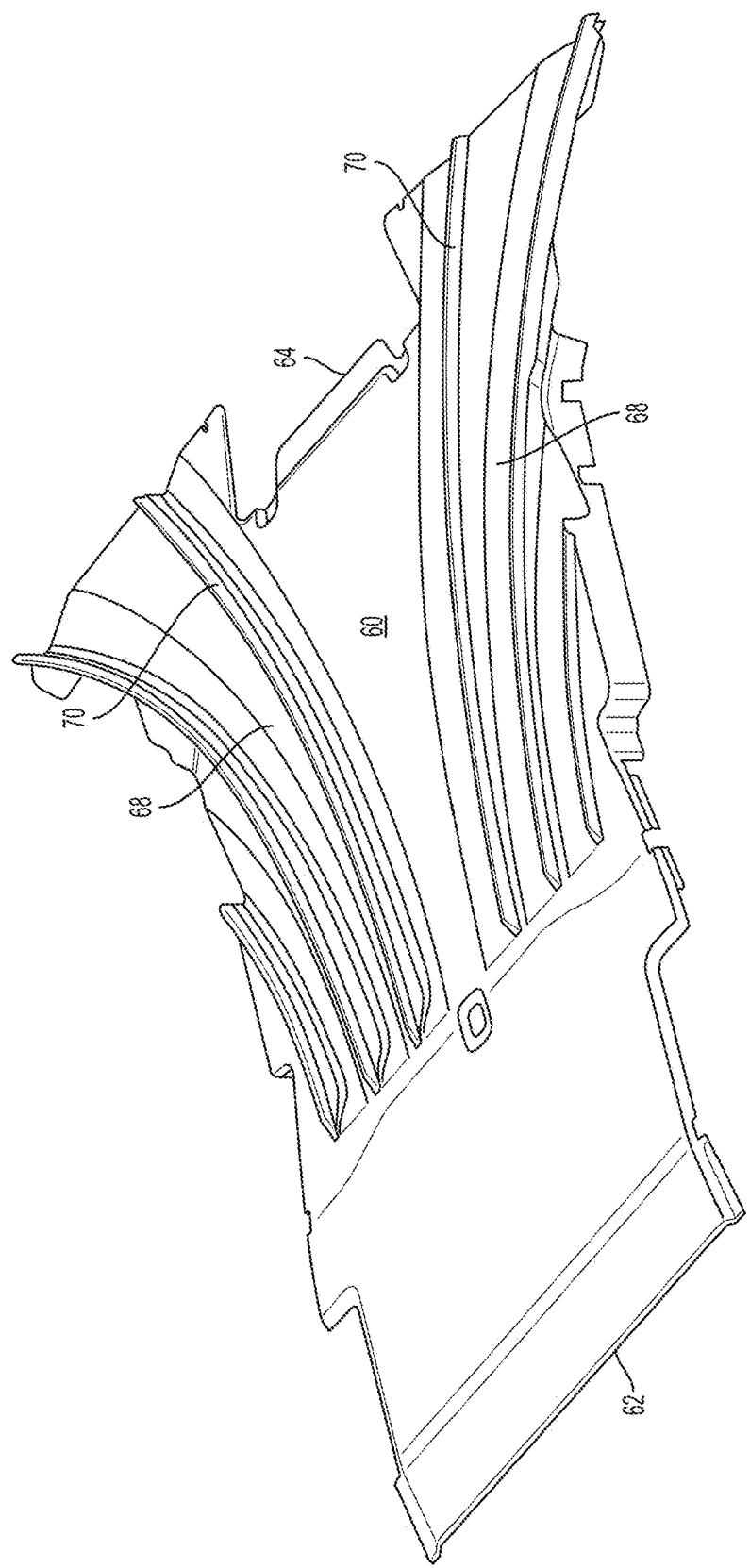
FIG. 5 illustrates an enlarged perspective view of an aerodynamic surface in accordance with aspects of an exemplary embodiment.

One or more wheel wells 32 are provided in the underbody 26 proximate the front end 16 of the vehicle body 14, and at least one aerodynamic surface 60 is disposed adjacent the one or more wheel wells 38 in the underbody 26 (see FIG. 4). The at least one aerodynamic surface 60 wherein the at least one aerodynamic surface 60 includes at least one curved triangular channel 68 configured to cause airflow to separate over a trip edge 70 (see FIG. 5) of the at least one curved triangular channel 68 to create a low pressure vortex region within the curved triangular channel 68.

Figure 6A:
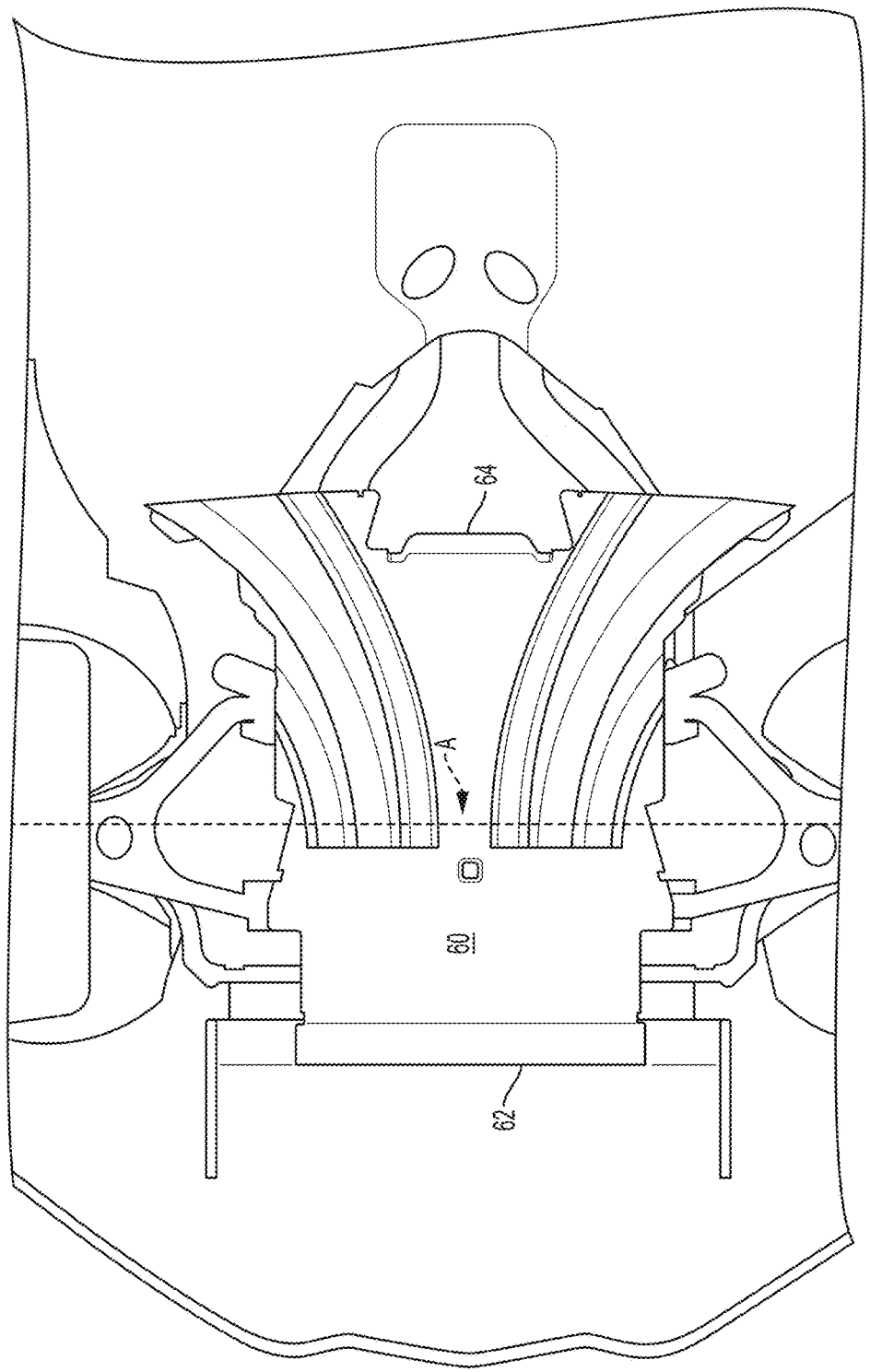
FIG. 6A illustrates a cross sectional cut line on the aerodynamic surface of FIG. 4.
Figure 6B:
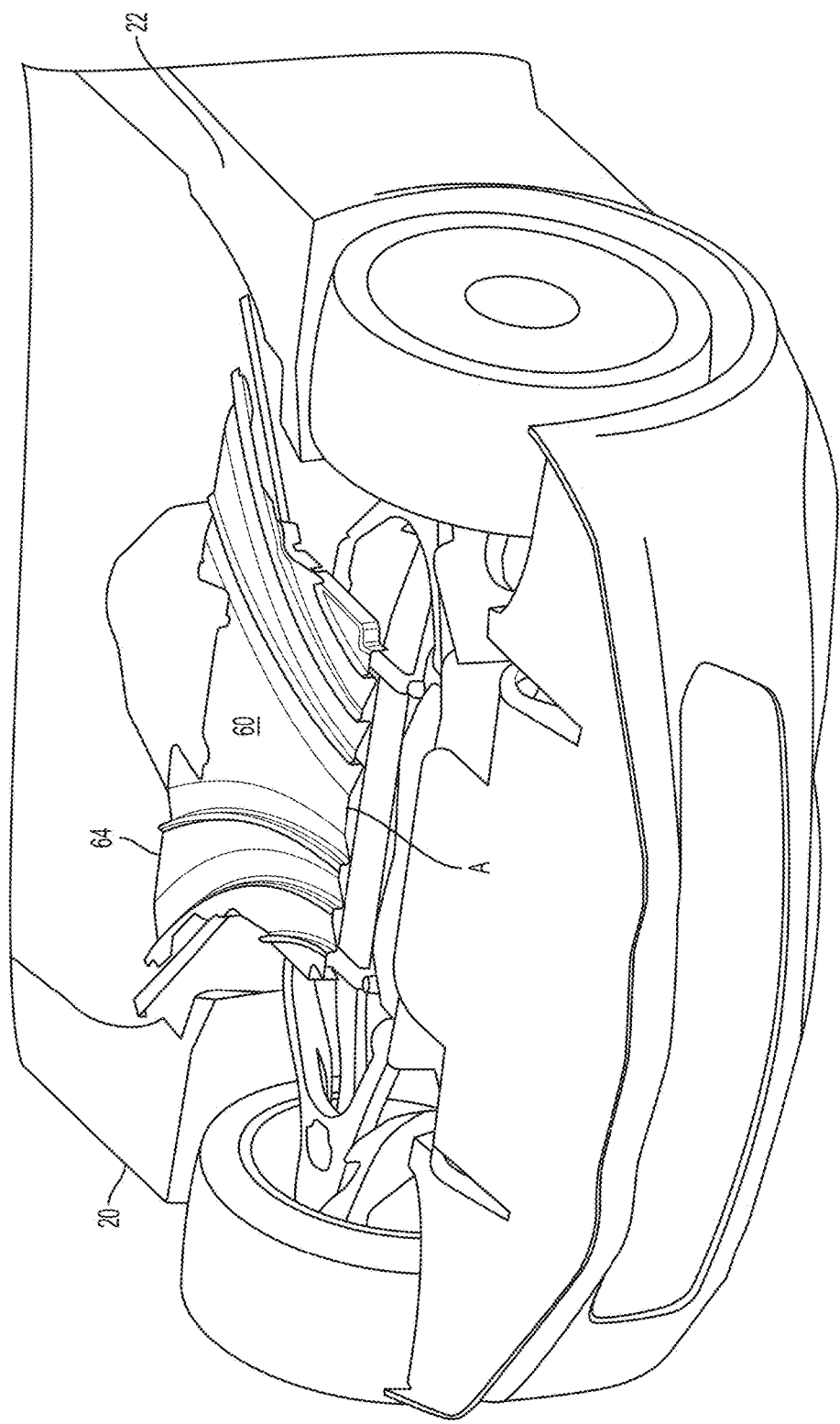
FIG. 6B illustrates a perspective view of the cross sectional cut of the aerodynamic surface of FIG. 6A.
Figure 6C:
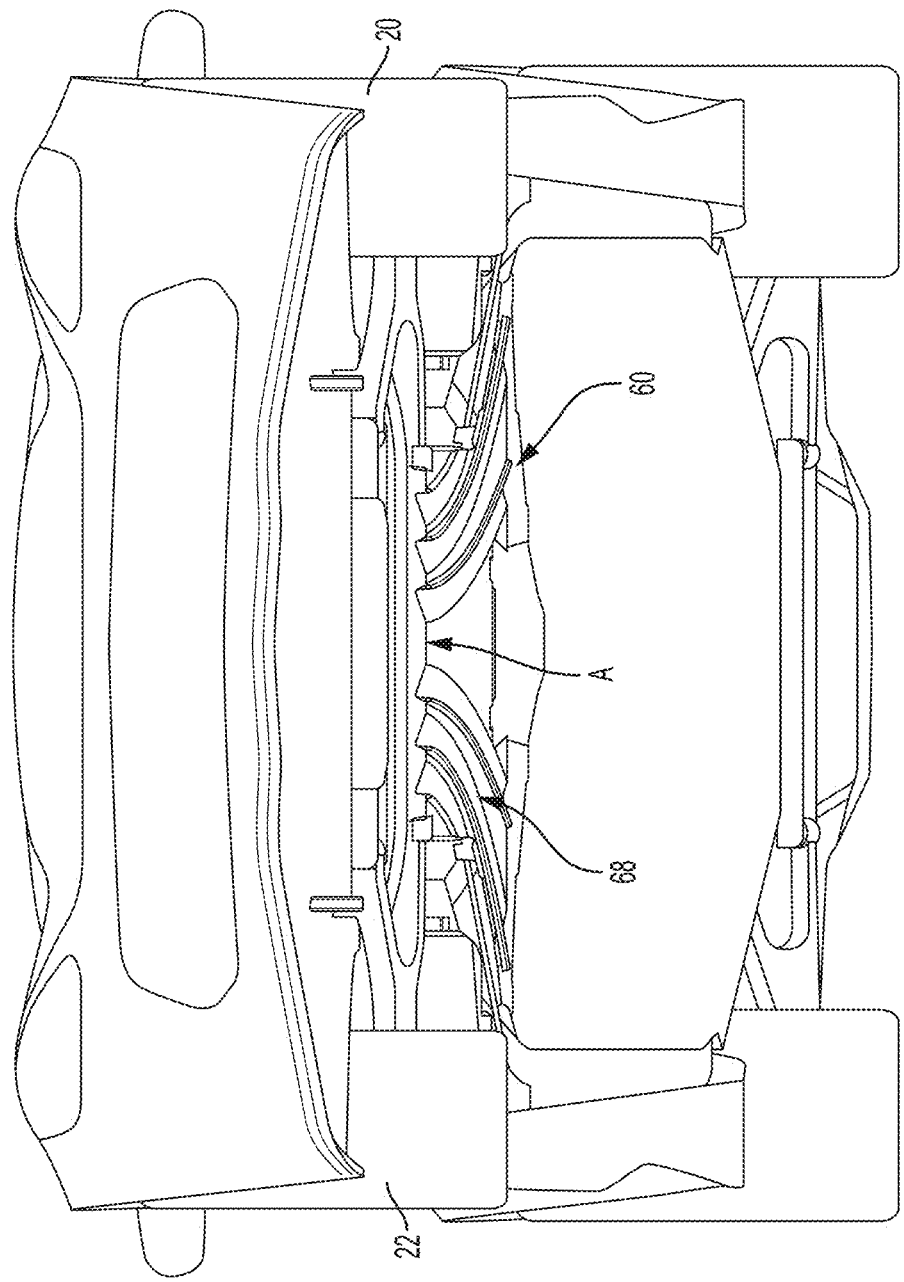
FIG. 6C illustrates a front underbody view of the aerodynamic surface of FIG. 6B.

Referring now to FIGS. 6A-6C, wherein FIG. 6A illustrates a cross sectional cut line (A) on the aerodynamic surface 60 of FIG. 4 between the leading portion 62 positioned proximate the one or more wheel wells and a trailing portion 64 positioned proximate the central region 66 of the underbody 26. FIG. 6B illustrates a perspective view of the cross sectional cut of the aerodynamic surface in FIG. 6A. The cut edge (A) of the aerodynamic surface 60 illustrates the triangular shape of the curved channels 68 wherein the apex of the triangular channels extends toward the underbody 26 of the vehicle 10 and the trip edge 70 extend away from the underbody 26 while maintaining a low profile protrusion into the space 50 between the underbody 26 and the road surface 12. FIG. 6C illustrates a front underbody view of the aerodynamic surface of FIG. 6B wherein again the apex of the curved triangular channels 68 are shown to extend upward toward the underbody 26 of the vehicle 10.

Figure 7:
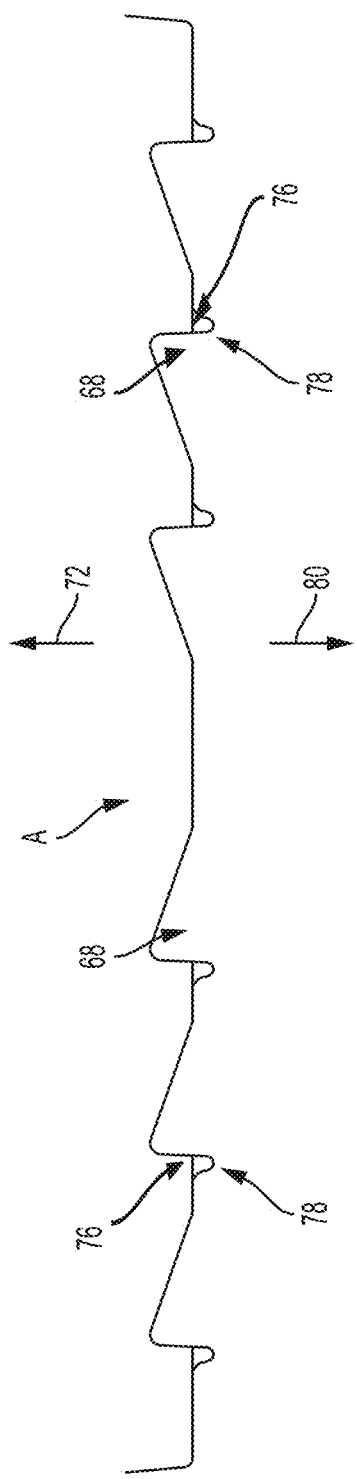
FIG. 7 illustrates a cross sectional trace view of embodiments of the aerodynamic surface in accordance with aspects of the exemplary embodiments.

Referring now to FIG. 7, an illustration of a cross sectional view (A) of embodiments of the aerodynamic surface in accordance with aspects of the exemplary embodiments is provided. Again it is illustrated how the curved triangular channel 68 extend in an upward direction 72 toward the underbody of the vehicle 10. In accordance with two embodiments of the aerodynamic surface 26, a first embodiment includes a flush trip edge 76 which is configured to cause airflow to separate create a low pressure vortex region within the curved triangular channel as it flows over the trip edge while the vehicle 10 is in motion. A second embodiment in accordance with exemplary embodiments include a proud trip edge 78 protrudes in direction 80 slightly further into the space 50 between the underbody 26 of the vehicle 10 and the road surface. The proud trip edge 78 is configured to cause airflow to separate create a stronger low pressure vortex region within the curved triangular channel 68 as it flows over the trip edge while the vehicle 10 is in motion. This in turn creates a greater aerodynamic downforce while the vehicle 10 is in motion, particularly at high speeds.

Figure 8:
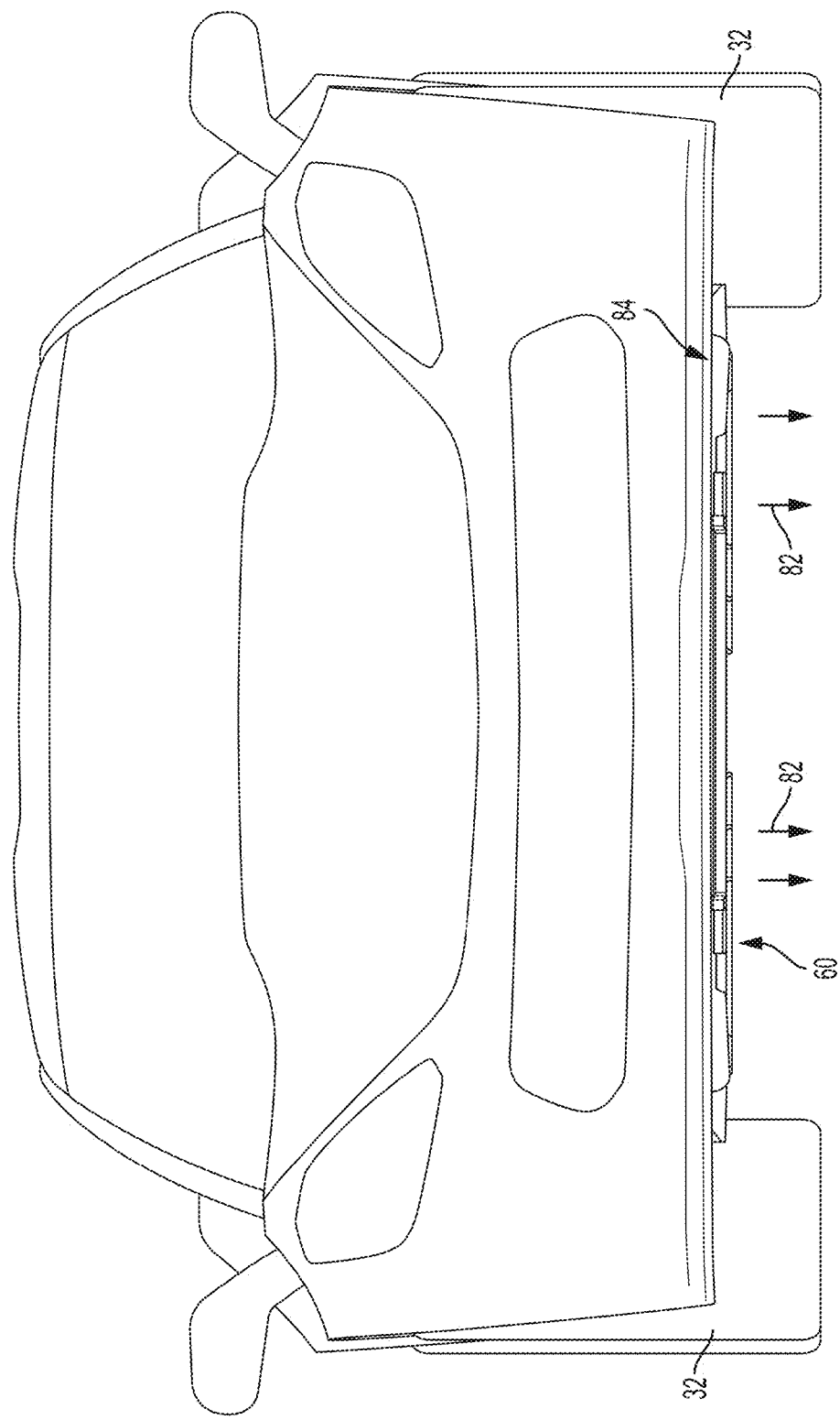
FIG. 8 is a front view of a vehicle having an aerodynamic surface displaying a low profile relative to the underbody.

FIG. 8 is a front view of a vehicle having an aerodynamic surface displaying a low profile relative to the underbody 26. The aerodynamic surface 60 may be configured such that it presents a sub flush profile with the underbody 26 surface. It is appreciated that the primary purpose of the aerodynamic surface 60 is to create low pressure regions within the curved triangular channels 68 as airflow ravels over the trip edge when the vehicle is in motion. This generated low pressure region creates a downforce in the direction 82 that is normal to the aerodynamic surface 60.

Figure 9:
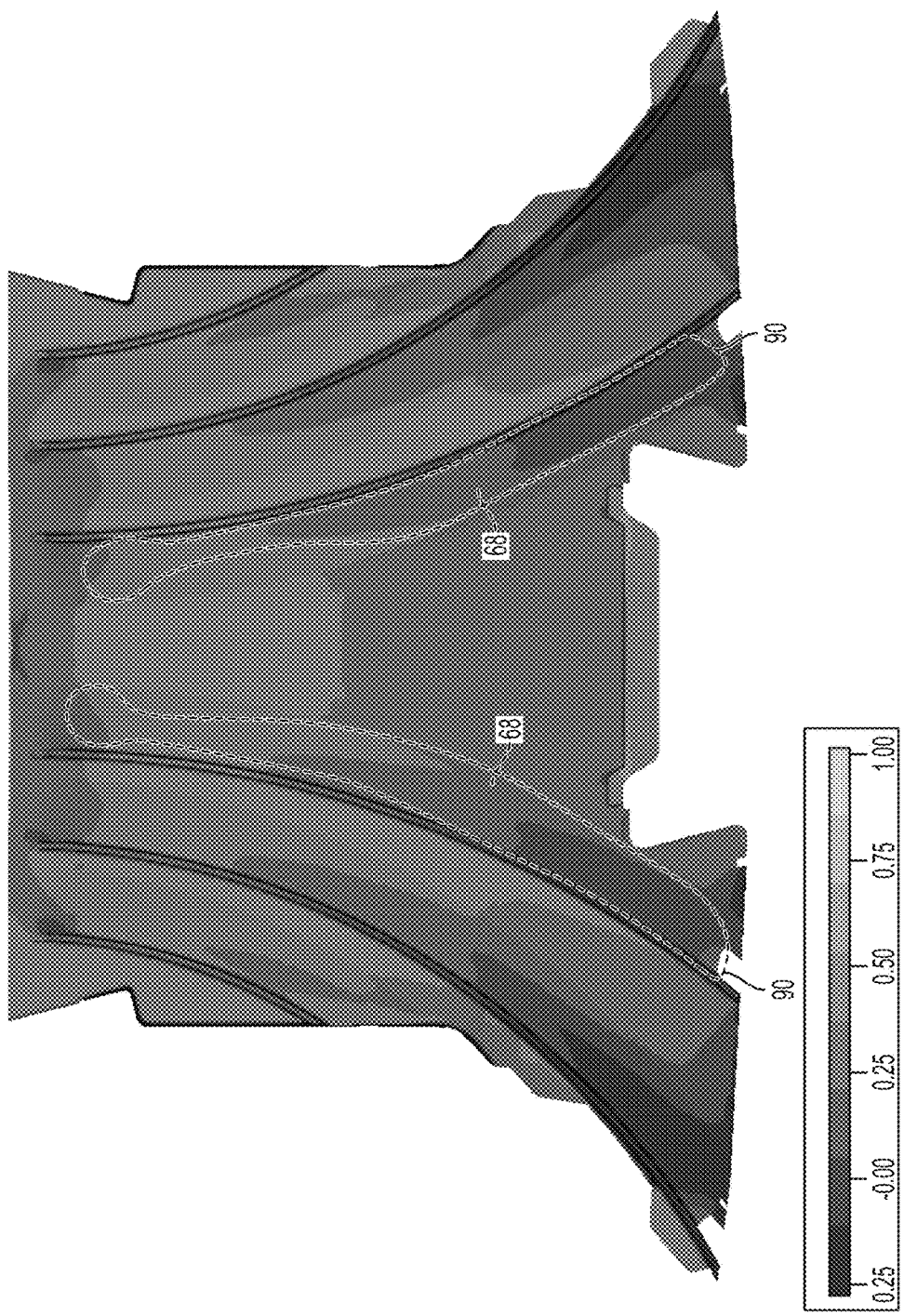
FIG. 9 illustrates the low pressure flow fields generated by the aerodynamic surface in accordance with aspects of the exemplary embodiments.

Referring now to FIG. 9, an illustration of the low pressure flow fields 90 generated by the aerodynamic surface 60 in accordance with aspects of the exemplary embodiments is provided. The low pressure regions 90 are generated in the curved triangular channels as airflow travels over the trip edge of the aerodynamic surface 60 and the size of the low pressure region will increase with the increased speed of the vehicle 10.

The detailed description and the drawings or Figs are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a vehicle body having a first end and an opposing second end, wherein the first end is configured to face oncoming airflow when the vehicle is in motion relative to a road surface;
an underbody extending between the first and second ends of the vehicle body and defining a space between the vehicle body and the road surface, the underbody including a first lateral edge, an opposing second lateral edge and a central region defined therebetween; and
at least one aerodynamic surface disposed on the underbody wherein the at least one aerodynamic surface includes at least one curved triangular channel having an apex, the at least one curved triangular channel configured to cause airflow to separate over a trip edge of the at least one curved triangular channel to create a low pressure vortex region within the curved triangular channel,
wherein the apex of the at least one curved triangular channel extends toward the underbody and the trip edge extends away from the underbody.

2. The vehicle of claim 1 wherein the at least one curved triangular channel is low profile to the underbody.

3. The vehicle of claim 1 wherein the at least one curved triangular channel is sub-flush to the underbody.

4. The vehicle of claim 1 wherein the trip edge of the at least one aerodynamic surface further comprises a proud trip edge.

5. The vehicle of claim 1 wherein the trip edge of the at least one aerodynamic surface further comprises a flush trip edge.

6. The vehicle of claim 1 wherein the at least one aerodynamic surface comprises a first curved triangular channel wherein the first curved triangular channel is directed toward the first lateral edge of the underbody; and
at least a second curved triangular wherein the at least second curved triangular channel is directed toward the first lateral edge of the underbody.

7. The vehicle of claim 6 wherein the at least one aerodynamic surface further comprises:
a third curved triangular channel opposite the first curved triangular channel wherein the third curved triangular channel is directed toward the opposing second lateral edge of the underbody; and
at least a fourth curved triangular channel opposite the at least second curved triangular channel wherein the at least fourth curved triangular channel is directed toward the opposing second lateral edge of the underbody.

8. The vehicle of claim 1 wherein the at least one aerodynamic surface is integrally formed into the underbody.

9. A vehicle comprising:
a vehicle body having a first end and an opposing second end, wherein the first end is configured to face oncoming airflow when the vehicle is in motion relative to a road surface;
an underbody extending between the first and second ends of the vehicle body and defining a space between the vehicle body and the road surface, the underbody including a first lateral edge, an opposing second lateral edge and a central region defined therebetween; and
at least one aerodynamic surface disposed on the underbody, the at least one aerodynamic surface comprising at least one curved triangular channel having an apex, the at least one curved triangular channel configured to cause airflow to separate over a trip edge of the at least one curved triangular channel to create a low pressure vortex region within the curved triangular channel,
wherein the at least one aerodynamic surface comprises a first curved triangular channel wherein the first curved triangular channel is directed toward a first lateral edge of the vehicle body; and
at least a second curved triangular channel wherein the at least second curved triangular channel is directed toward the first lateral edge of the underbody
wherein the apex of the at least one curved triangular channel extends toward the underbody and the trip edge extends away from the underbody.

10. The vehicle of claim 9 wherein the first and second curved triangular channels are integrally formed into the underbody.

11. The vehicle of claim 9 wherein the trip edge of the at least one aerodynamic surface further comprises a proud trip edge.

12. The vehicle of claim 9 wherein the trip edge of the at least one aerodynamic surface further comprises a flush trip edge.

13. The vehicle of claim 9 wherein the at least one aerodynamic surface further comprises:
  - a third curved triangular channel opposite the first curved triangular channel wherein the third curved triangular channel is directed toward an opposing second lateral edge of the vehicle body; and
  - at least a fourth curved triangular channel opposite the at least second curved triangular channel wherein the at least fourth curved triangular channel is directed toward the opposing second lateral edge of the underbody.

14. The vehicle of claim 13 wherein the third and fourth curved triangular channels are integrally formed into the underbody.

15. The vehicle of claim 14 wherein the curved triangular channels are low profile to the underbody.

16. The vehicle of claim 14 wherein the curved triangular channels are sub-flush to the underbody.

* * * * *